April 12, 1955          E. SCHRAMM          2,706,019
SELF RETRACTING HANDLE FOR DOLLIES AND HAND TRUCKS
Filed March 8, 1954          2 Sheets-Sheet 1
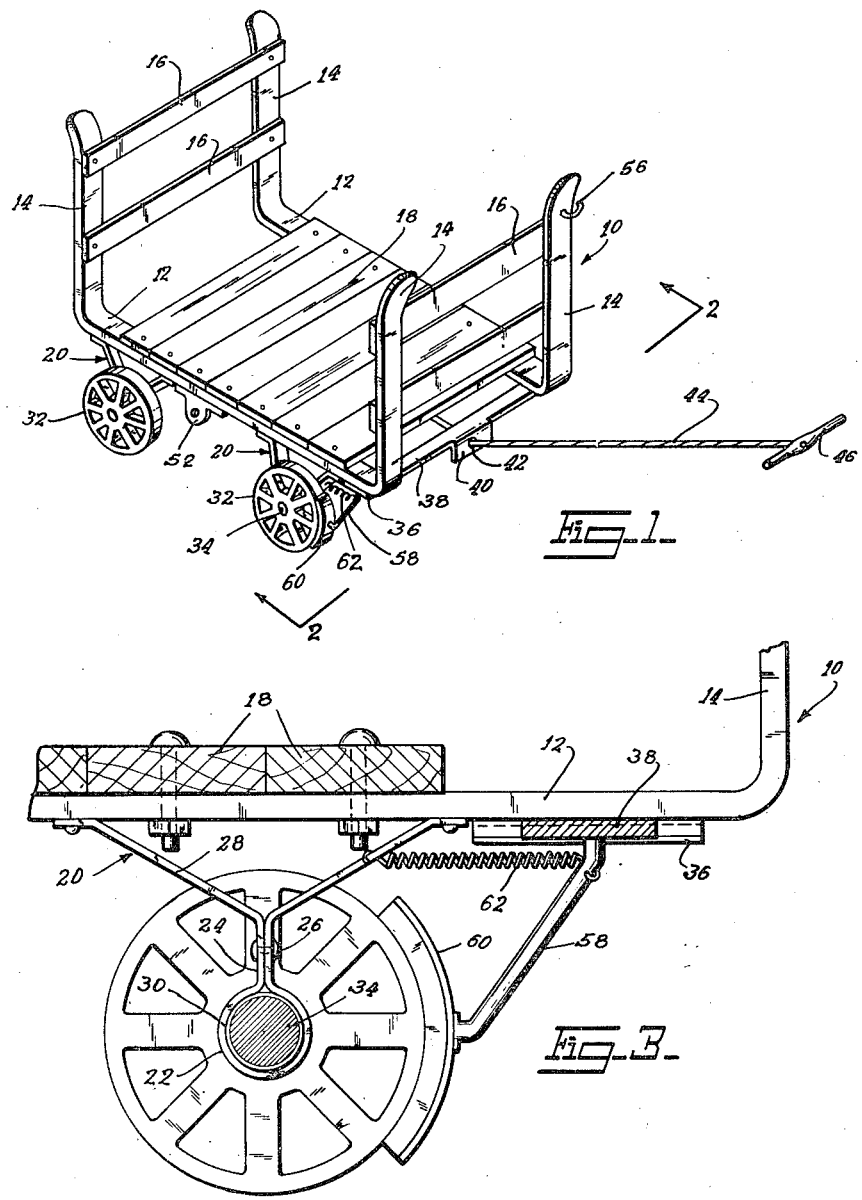
INVENTOR.
ELLA SCHRAMM
BY
ATTORNEY April 12, 1955 E. SCHRAMM 2,706,019
SELF RETRACTING HANDLE FOR DOLLIES AND HAND TRUCKS
Filed March 8, 1954 2 Sheets-Sheet 2
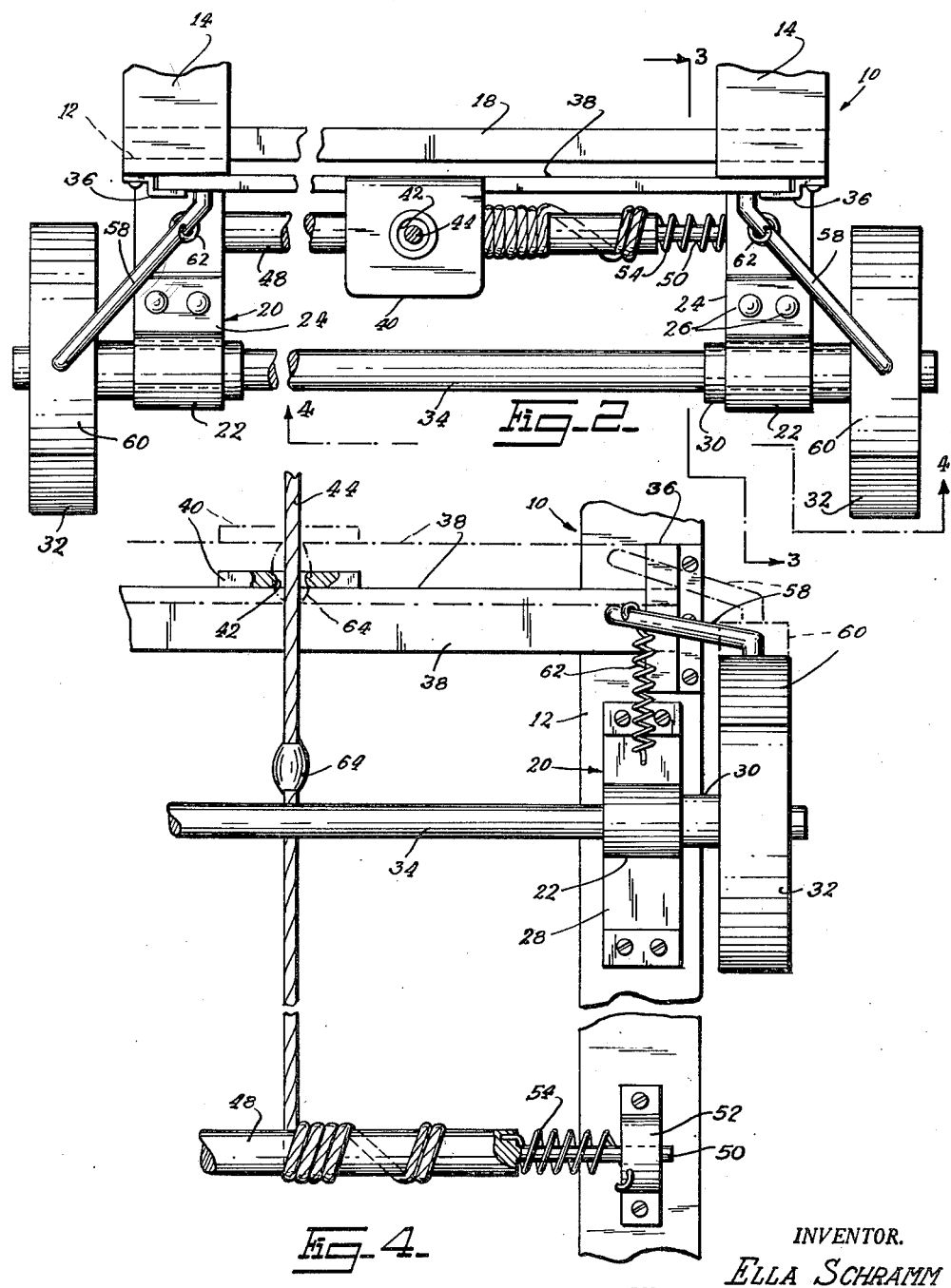
INVENTOR.
ELLA SCHRAMM
BY
ATTORNEY

United States Patent Office 2,706,019
Patented Apr. 12, 1955

2,706,019

SELF RETRACTING HANDLE FOR DOLLIES AND HAND TRUCKS

Ella Schramm, Brooklyn, N. Y.

Application March 8, 1954, Serial No. 414,662

11 Claims. (Cl. 188—122)

This invention relates to dollies, hand trucks, and similar rollable article carriers. More particularly, the invention has reference to a device of the nature referred to that is equipped with a self-retracting, flexible handle to facilitate its being moved from place to place.

Ordinarily, dollies and hand trucks of the type that are pulled, rather than pushed, are provided with rigid handles. These are often extended forwardly along the floor surface when the dolly is idle, thus representing a distinct hazard over which persons may trip and fall. An important object, accordingly, is to provide a retractable handle for hand trucks which will automatically retract when the truck is not being pulled by a worker, the handle thus shifting, without conscious effort on the part of said worker, to a position in which it will not extend as an object over which one might trip.

Another object is to associate with the handle a brake assembly that will automatically shift to wheel-locking position whenever the handle retracts or goes slack. It is proposed, in this way, to insure against movement of the truck when it is left unattended. It is further proposed that the arrangement serve to automatically brake the truck when it tends to gain excessive momentum, as for example, when it is being pulled and is travelling down a slight grade.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a hand truck and self-retracting handle assembly formed in accordance with the invention.

Fig. 2 is an enlarged transverse sectional view on line 2—2 of Fig. 1.

Fig. 3 is a fragmentary longitudinal sectional view substantially on line 3—3 of Fig. 2.

Fig. 4 is a fragmentary sectional view substantially on line 4—4 of Fig. 2.

Any of various types of rollable dollies or hand trucks can be equipped with the self-retracting handle constituting the invention, and by way of example, there is illustrated a four-wheel truck including parallel, longitudinally extending, horizontal frame members or side rails 12 of flat bar material, integral at their ends with upstanding end portions 14, the upper terminals of which may be curved longitudinally to a slight extent to facilitate loading, as shown in Fig. 1. The end portions are rigidly connected in transversely spaced relation by vertically spaced, horizontally extending cross braces 16 which also serve to retain the load against shifting in a direction longitudinally of the truck. Floor boards 20, extending transversely of the truck and bolted at their ends to the respective side rails 12, are in longitudinal contact with one another, and completely floor the truck, thus to permit stacking of a substantial number of articles thereupon.

Fixedly secured to the undersides of the side rails, adjacent the ends thereof, and aligned transversely of the truck, are paired, depending wheel hangers 20 formed of flat bar material bent to shape. Each hanger is formed with a circular midlength portion providing a journal 22, contacting portions 24 riveted together as at 26 and extending upwardly from the journal, and upwardly divergent end portions 28 bolted to the undersides of the respective side rails.

Engaged in the journals 22 are bushings 30. Front and rear axles 34 are rotatable in the bushings, and secured to the ends of the axles are wheels 32.

At the front end of the truck, there is provided a pair of guides 36. These are secured to the undersides of the front end portions of the side rails, and have downwardly offset, confronting inner edge portions slidably supporting the ends of a flat cross bar 38. Integrally formed upon and depending from the midlength portion of the cross bar is a tongue 40 having a center opening 42 the edge of which is rounded off to prevent fraying of a cable 44 extending therethrough. Cable 44 is adapted to be pulled through opening 42 to the position shown in Fig. 1 so as to constitute a flexible handle element equipped at its forwardly projected, free end with a transversely disposed handle member 46.

As best shown in Figs. 2 and 4, the cable 44 is coiled, at its inner end, about a roller 48 extending transversely of the truck below the floor boards, intermediate the ends of the truck. Roller 48, at its ends, is formed with trunnions 50 reduced substantially in diameter relative to the body of the roller, said trunnions being journalled in depending brackets 52 secured to the undersides of the side rails. Coiled about one of the trunnions is a spring 54 engaged at its ends with the bracket and roller, and tensioned to normally rotate the roller in a direction to coil the cable 44 thereupon. The roller assembly, it should be noted, is substantially like that of a conventional roll-type window shade, when considered per se. As a result, the cable element will be self-retracting, whenever the handle member 46 is released, the cable winding until the member 46 ultimately engages against the depending tongue 40. In this way, a very desirable safety feature is provided, in that there is no danger of one's tripping over the handle when the dolly is left unattended.

If desired, one can wind the cable about a hook 56 projecting forwardly from one of the front extensions 14, when the dolly is left unattended. In these circumstances, also, the handle will not represent a hazard to passers-by.

Brake means is incorporated in the construction, to co-act with the self-retracting handle, and includes a pair of depending brake shoe arms 58 of heavy rod material fixedly secured at their upper ends to the end portions of the cross bar. Arms 58 diverge downwardly as shown in Fig. 2, and are inclined rearwardly (Fig. 3). The lower, rearwardly disposed ends of the arms are rigidly attached to brake shoes 60 that are adapted to bear frictionally against the peripheries of the front wheels 32 to slow or prevent completely rotation of the same. Springs 62, attached at their ends to the front wheel hangers 20 and ears 58, respectively, are held under expansion, and tending to contract, yieldably hold the brake shoes in engagement with the wheels.

The operation of the truck is as follows: Assuming that the truck is not in use, and is unattended, the spring 54 will rotate the roller 48 in a direction to wind the cable 44 thereupon, thus retracting the handle defined by the cable and its associate handle member 46.

In this connection, the cable 44 is shown partially extended in full lines in Fig. 4, and is almost at the full limit of its movement to extended position. The brakes, however, are still set just as when the cable was fully retracted. This is a desirable safety feature, in that the brakes are set not only when the truck is standing idle, but also when the cable is being pulled outwardly to extended position.

When one continues pulling the cable outwardly to extended position, a projection, such as a large bead 64 attached fixedly to the cable, ultimately engages against tongue 40. Further pull on the cable will now cause the cross bar 38 to move to the dotted line position of Fig. 4. It may be noted in this regard that the spring 54 exerts only a slight restraint upon extension to the cable, the spring 54 only being strong enough to retract the cable when an opposing pull is not exerted thereon.

Movement of the cross bar to its dotted line position causes the brake shoes to shift with the cross bar, to the dotted line position thereof shown in Fig. 4, against the restraint of the springs 62. Continued pull on the flexible handle will now be effective to cause the truck to roll along the supporting surface.

Should the truck tend to accumulate an excessive amount of momentum, as for example while rolling down a grade, it will tend to reduce the distance between the truck and the worker pulling the same. Slack will immediately be created in the cable, and as a result, the springs 62 will immediately contract, shifting the brake shoes to wheel-engaging position to retard the acceleration of the truck. Only when the pull on the cable by the worker overcomes the springs 62 will the brakes again be released.

Further, whenever the truck is halted, the brakes will automatically shift to operative position once again, and will remain set until the worker pulls upon the handle. Of course, release of the handle when the truck is halted will not only result in automatic setting of the brakes, but also in self-retraction of the handle.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction.

2. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, said roller being extended transversely of the frame, the handle means further including brackets depending from the underside of the frame at the opposite sides thereof with said roller being journalled at its ends in the brackets.

3. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels.

4. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, said projection comprising a sleeve circumposed about and fixedly secured to the cable, said sleeve being greater in diameter than the guide opening.

5. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, the slidable mounting of the cross bar comprising guide bars secured to the frame and extending along opposite sides thereof, the cross bar having its ends slidably engaged between the guide bars and frame.

6. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, the slidable mounting of the cross bar comprising guide bars secured to the frame and extending along opposite sides thereof, the cross bar having its ends slidably engaged between the guide bars and frame, the guide bars having confronting, downwardly offset inner longitudinal edge portions on which the cross bar ends are supported.

7. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, said yielding means for biasing the cross bar comprising a pair of springs each secured at one end to an end portion of the cross bar, said frame including depending wheel hangers in which the wheels are rotatably mounted, the last-named springs being connected at their other ends to said hangers.

8. A hand truck including a support frame, wheels mounted thereon, self-retracting handle means carried by said frame, and brake means for the wheels adapted to shift to breaking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, the rigid connections of the brake shoes to the cross bar comprising brake shoe arms fixedly attached at their opposite ends to the shoes and cross bar respectively.

9. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, the rigid connections of the brake shoes to the cross bar comprising brake shoe arms fixedly attached at their opposite ends to the shoes and cross bar respectively, the arms diverging downwardly, and being inclined from their upper ends in a rearward direction.

10. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the truck on movement of the cross bar in said direction, the cable including a projection engaging the tongue on extension of the cable from the frame, to shift the cross bar in an opposite direction and thus release the brake shoes from engagement with the wheels, said yielding means for biasing the cross bar comprising a pair of springs each secured at one end to an end portion of the cross bar, said frame including depending wheel hangers in which the wheels are rotatably mounted, the last-named springs being connected at their other ends to said hangers, each of said wheel hangers being formed from a length of flat bar material bent to include at its midlength portion a circular journal, said hanger including upwardly divergent end portions, the last-named springs being attached to the end portions of the hangers.

11. A hand truck including a support frame, wheels mounted thereon, self-retracting handle means carried by said frame, and brake means for the wheels adapted to shift to braking position responsive to retraction of the handle means, said handle means comprising a roller rotatably mounted on the frame, a cable wound about the roller, a handle member attached to the cable, and a spring associated with the roller and tensioned to rotate the roller in a cable-winding direction, the brake means including a cross bar slidably mounted on the frame, yielding means tensioned to bias the cross bar in one direction, the cross bar including a depending tongue having a guide opening, the cable extending through said opening, and brake shoes having rigid connections to the cross bar to shift therewith, said brake shoes shifting into engagement with selected wheels of the trunk on movement of the cross bar in said direction, the cable including a projection engaging the tongue on extension of the cable from the frame, to shift the cross bar in an opposite direction and thus release the brake shoes from engagement with the wheels, said yielding means for biasing the cross bar comprising a pair of springs each secured at one end to an end portion of the cross bar, said frame including depending wheel hangers in which the wheels are rotatably mounted, the last-named springs being connected at their other ends to said hangers, each of said wheel hangers being formed from a length of flat bar material bent to include at its midlength portion a circular journal, said hanger including upwardly divergent end portions, the last-named springs being attached to the end portions of the hangers, said truck further including axles secured to the wheels and rotatable in said journals.

References Cited in the file of this patent

UNITED STATES PATENTS

| | | |
|---|---|---|
| 296,896 | Underwood | Apr. 15, 1884 |
| 2,297,589 | Tackett | Sept. 29, 1942 |